Sept. 11, 1951          A. B. BRANCO          2,567,800
REAR DELIVERY RAKE WITH FRICTIONAL DRAFT DUMPER
Filed May 13, 1946                                4 Sheets-Sheet 1

INVENTOR
*Abel B. Branco*
BY
ATTYS

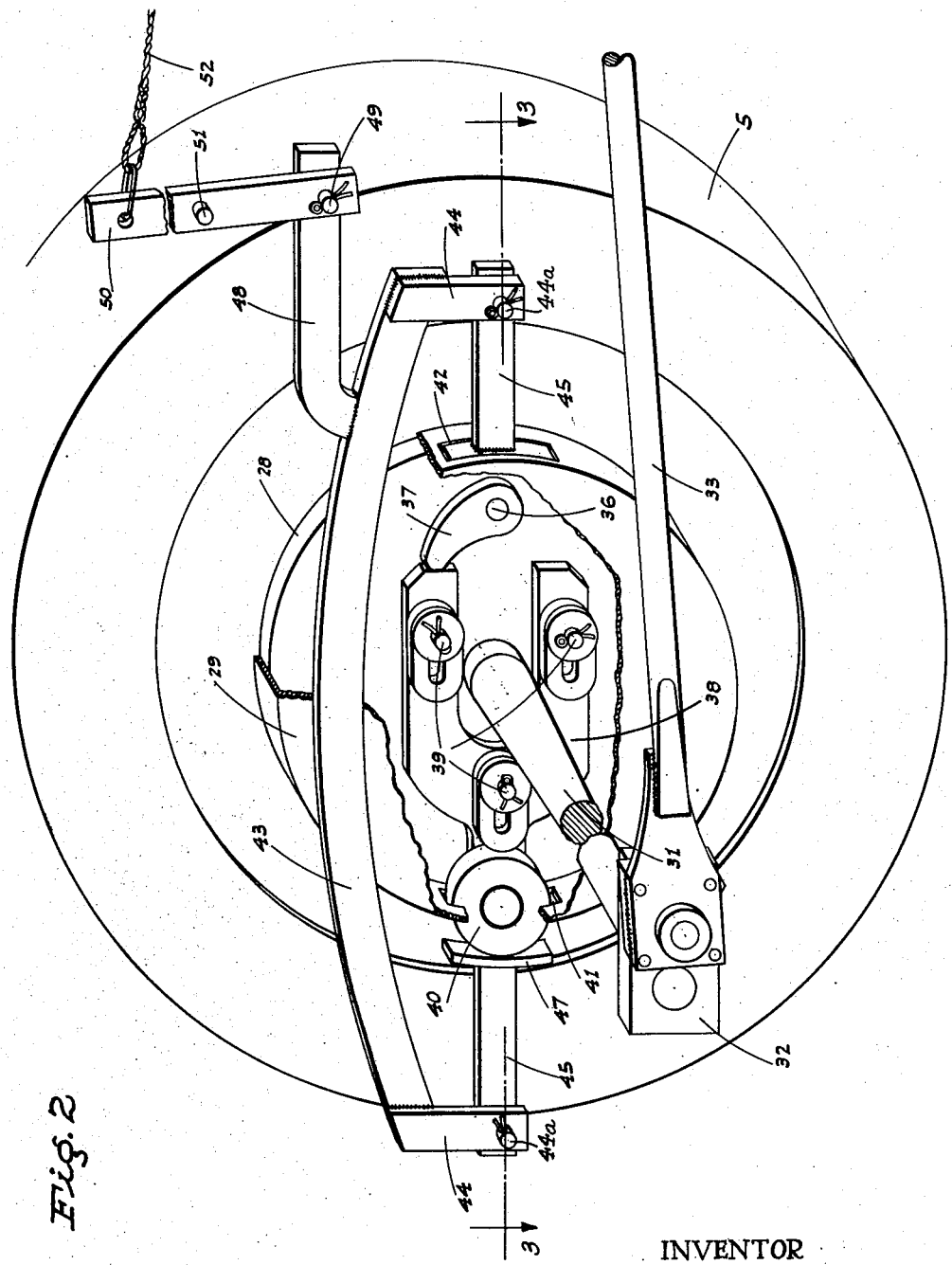

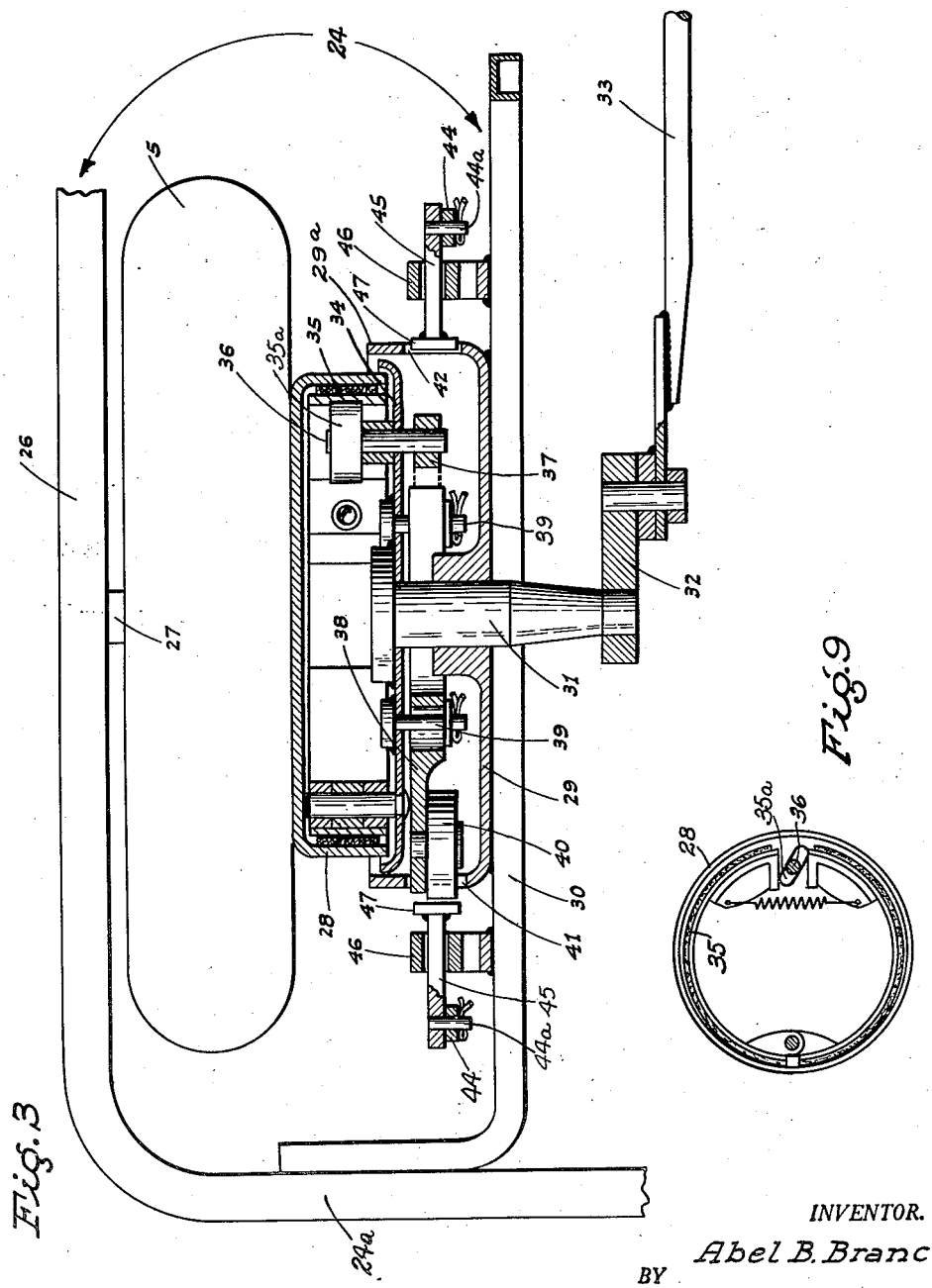

Sept. 11, 1951  A. B. BRANCO  2,567,800
REAR DELIVERY RAKE WITH FRICTIONAL DRAFT DUMPER
Filed May 13, 1946  4 Sheets-Sheet 4
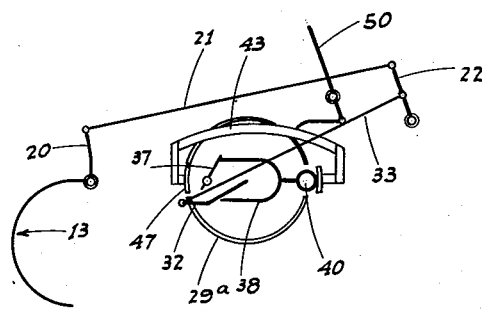
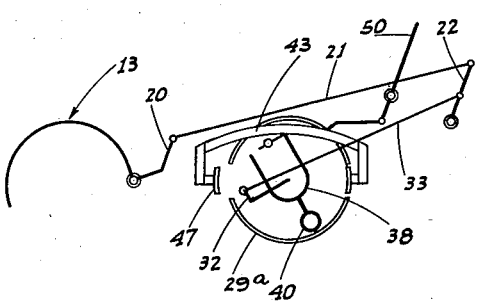
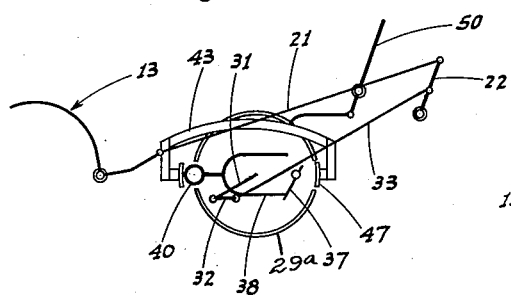
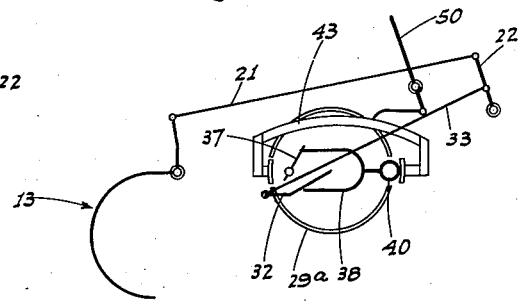
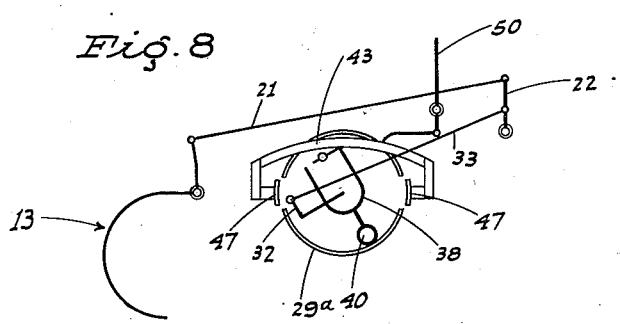
INVENTOR
Abel B. Branco
BY
ATTYS

UNITED STATES PATENT OFFICE 2,567,800

REAR DELIVERY RAKE WITH FRICTIONAL DRAFT DUMPER

Abel B. Branco, Manteca, Calif.

Application May 13, 1946, Serial No. 669,420

18 Claims. (Cl. 56—388)

This invention is directed to, and it is an object to provide, a hay rake of improved construction and operation.

Another object of the invention is to provide a hay rake which is wheel supported, and includes a novel wheel actuated mechanism arranged to operate the rake unit; i. e. to cause the rake unit to raise and lower, or to raise and remain in said position, or to recurringly raise and lower, under the control and at the selection of the tractor operator.

A further object of the invention is to provide a hay rake having a relatively great width or gauge; the rake including a sectional frame longitudinally centrally hinged so that one side or section of the frame can be folded to an upright position whereby to decrease the width of the implement for transport through gates, along highways, etc. The implement includes a cable and winch arrangement to accomplish such upward folding of said one frame section.

A further object of the invention is to provide a practical hay rake, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged fragmentary, perspective elevation of the wheel actuated mechanism partly broken away; the parts of said mechanism being shown in position to maintain the rake units raised.

Fig. 3 is a sectional plan, enlarged, of the wheel actuated mechanism substantially on line 3—3 of Fig. 2.

Figure 1:
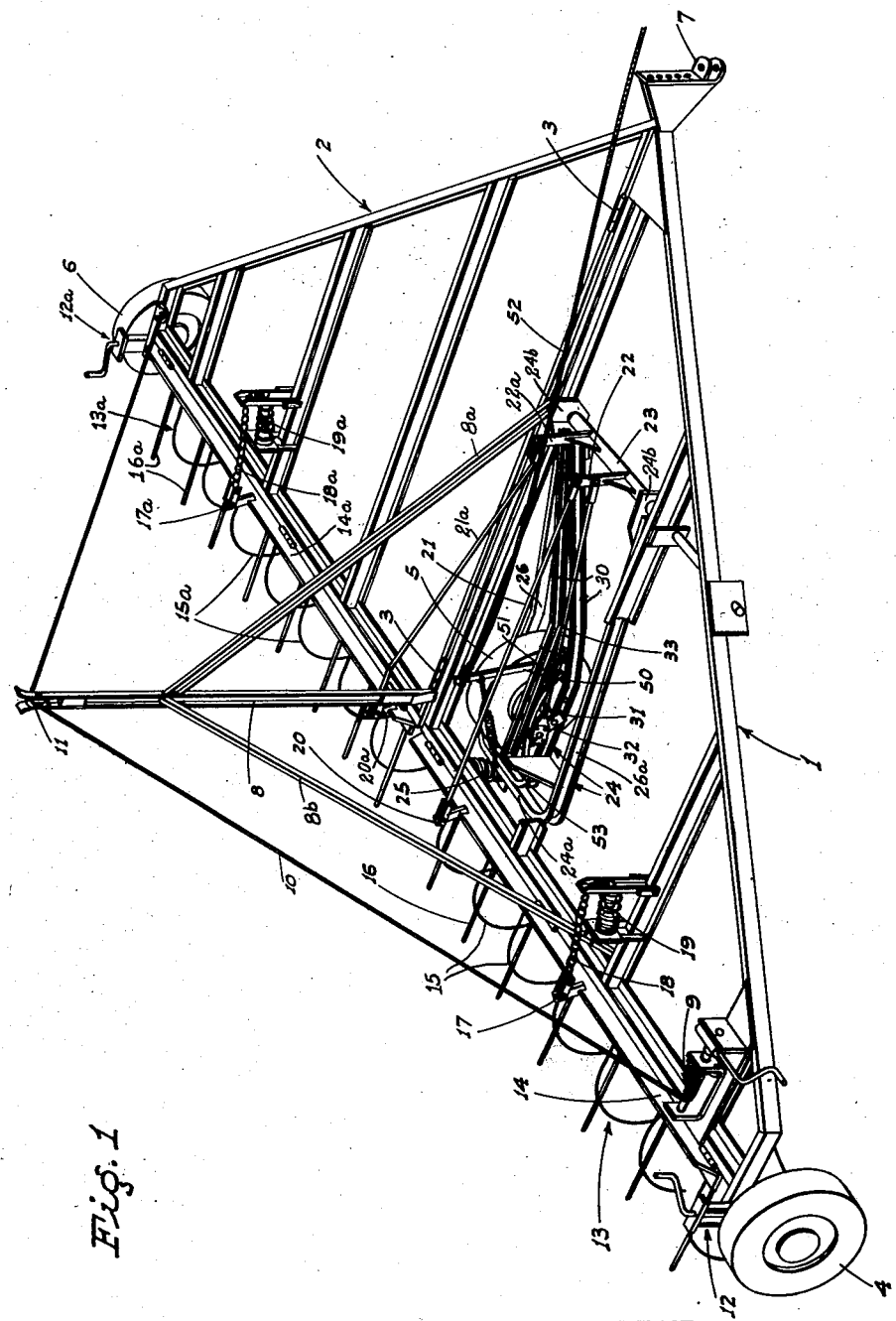
Fig. 1 is a perspective view of the implement.

Figs. 4-8, inclusive, are diagrammatic views illustrating various positions of the wheel actuated mechanism and the rake units operated thereby.

Fig. 9 is a somewhat diagrammatic elevation of the conventional form of internal expanding brake unit employed in the implement.

Referring now more particularly to the characters of reference on the drawings, the implement comprises a pair of generally triangular frame sections, indicated at 1 and 2; said frame sections being disposed in side by side relation and hinged along the longitudinal central plane of the implement, as at 3, for upward swinging movement of the frame section 2 from its normally extended position to an upwardly projecting position for transport.

The frame section 1 is supported, adjacent the rear thereof, by a pair of transversely spaced, pneumatic-tired wheels, indicated at 4 and 5, respectively, while the frame section 2 is supported, at the outside, by a pneumatic-tired wheel 6.

A hitch 7, on the forward end of the frame section 1, is provided for the purpose of coupling the implement to a tractor.

The frame section 2 is folded from its extended position to its upstanding position by means of the following arrangement:

A rigid mast 8 is mounted on the frame section 1 adjacent its rear inner corner, and said mast is braced from said section by braces 8a and 8b diagonaling forwardly and laterally, respectively, as shown. A hand winch 9 is mounted on the rear outer corner of the frame section 1, and a cable 10 leads from the winch 9 laterally upwardly and over a pulley 11 on the upper end of the mast 8. From the pulley 11 the cable 10 extends downward to connection with the rear outer corner of the frame section 2. With operation of the winch 9 in a direction to wind the cable 10 thereon the frame section 2 is effectively swung upward to its upstanding, transport position.

The wheels 4 and 6 are carried on suitable mounts on the frame sections 1 and 2, and indicated at 12 and 12a, respectively.

At its rear end the implement includes, on each of the frame sections 1 and 2, a rake unit, indicated generally at 13 and 13a, respectively; such rake units comprising rake bars 14 and 14a, respectively, hinged to the corresponding frame section for vertical swinging motion. Outwardly and downwardly curved rake teeth or tines 15 and 15a are mounted on the rake bars 14 and 14a, respectively, and said tines cooperate with strippers 16 and 16a, respectively, which project rearwardly from the rear end of the frame sections 1 and 2.

Intermediate their ends the rake bars 14 and 14a are fitted with rigid upstanding arms 17 and 17a, respectively, connected to cables 18 and 18a, respectively, which lead forward to shock absorbing spring units 19 and 19a, respectively; such shock absorbing spring units serving to catch the corresponding rake units 13 and 13a to prevent too forceful engagement of the latter with the ground.

Other rigid arms 20 and 20a upstand from the rake units 13 and 13a adjacent the longitudinal center of the implement, and actuating rods 21 and 21a are pivotally attached to the arms 20 and 20a, respectively, and extend forwardly to a point above the frame section 1 adjacent but short of its forward end.

At such point the actuating rods 21 and 21a pivotally connect with radial arms 22 and 22a, respectively, which are fixed on and upstand, in spaced relation, from a cross shaft 23 journaled in the frame section 1.

A sub-frame 24, generally U-shape in plan, extends rearwardly from the cross shaft 23, upward movement of said sub-frame at its rear end being limited by a heavy-duty compression spring 25. Sub-frame 24 includes longitudinal side beams 26 and 26a connected by the rear end cross member 24a, and an intermediate longitudinal beam unit 30, which at its forward end converges laterally to a junction with beam 26, and at its rear end is secured in connection with cross member 24a and beam 26a; the wheel 5 being disposed between beams 26 and 30. At their forward end, beams 26 and 26a are provided with bearing plates 24b through which shaft 23 projects in supporting and relatively turnable relation.

By reason of the spring mounting of the sub-frame 24, wheel 5 may rise and fall, due to ground irregularities, without affecting the level of the frame sections 1 and 2.

The cross shaft 23 is adapted to be rocked to and fro, whereby to cause raising and lowering of the rake units 13, by means of mechanism actuated from the implement supporting wheel 5, and which mechanism is constructed as follows:

The wheel 5 is supported from beam 26 of the sub-frame 24 by a spindle 27, and said wheel includes, on the side opposite the beam 26, a brake drum 28. Another annular drum 29 is rigidly fixed on beam unit 30 of the sub-frame 24 adjacent the brake drum 28. The fixed drum 29 includes an annular flange 29a which forms an internal track, for the purpose hereinafter described.

A spindle 31 is journaled axially in the fixed drum 29, and said spindle is formed, on its outer end, with a crank 32 pivotally attached to one end of a connecting rod 33. The other end of said connecting rod 33 is pivotally attached to one of the radial arms 22 on the cross shaft 23; said radial arm 22 and the crank 32 being substantially alined lengthwise of the implement.

Within the fixed drum 29 the spindle is secured axially to a radial disc 34 disposed in close, facing relation to the open end of the brake drum 28.

A conventional normally spring released internal brake band assembly 35 is anchored on the disc 34 and extends in cooperative relation within the brake drum 28 of wheel 5. The brake band assembly 35 includes, as the brake engaging means, a cam 35a mounted on a stub shaft 36 which projects through the disc 34 into the fixed drum 29. On its outer end, and within the fixed drum 29, the stub shaft 36 is fixed with a cam lever 37 which bears against the end of one leg of a fork 38 which extends across the disc 34 in guided relation on guide pins 39. At the end opposite the cam lever 37 the fork 38 is fitted with a roller 40 which is adapted to ride or track within the fixed drum 29; the fork then being in a position causing the cam lever to engage the brake band assembly 35; the latter being of a type which normally spring urges the cam lever 37 in a direction tending to shift the fork 38 and roller 40 radially outwardly.

The fixed drum 29 is formed, on opposite sides thereof, with slots 41 and 42 adapted for the reception, in seating relation, of the roller 40, in the manner clearly shown in Figs. 2 and 3; the roller being adapted to seat in either of said slots for the purpose hereinafter described. When the roller is seated in either the slot 41 or 42, the fork 38 is radially advanced to an extent such that the brake band assembly 35 is released, which is its normal condition.

A saddle bar 43 extends lengthwise of the implement alongside the fixed drum 29 above the spindle 31; such saddle bar having rigid depending end legs 44, which are pivotally connected at their lower ends by pins 44a, to substantially alined horizontal arms 45 which project toward the drum 29 through guides 46 projecting laterally from beam unit 30 (see Fig. 3), and terminate adjacent the slots 41 and 42. At their inner ends the arms 45 are fitted with arcuate shoes 47 adapted to engage in the adjacent slot 41 or 42 in symmetrical, closing relation thereto. The spacing between the shoes 47 is such that only one thereof may engage in the corresponding slot at a time; the other shoe then being radially outwardly spaced from its corresponding slot a substantial distance, as shown in Fig. 3.

The saddle bar 43 includes a forwardly projecting arm 48 which pivotally connects, as at 49, with the lower end of an upstanding lever 50; the lever being pivoted, intermediate its ends, as at 51, in the beam unit 30 of the sub-frame 24 as shown in Fig. 1. A pull cord 52 extends from the upper end of the lever 50 forwardly to the tractor, while a pull-back spring 53 connects between said lever and a rear point on the sub-frame, whereby to normally maintain said lever at a rearward and upward incline.

*Operation*

In operation of the above described mechanism, the various operational positions of which are illustrated diagrammatically in Figs. 4–8 inclusive, the roller 40 is normally disposed in the slot 42, which is on the front of the drum 29. With the roller in such normal position the crank 32 is disposed so that the connecting rod 33, working through the assembly of cross shaft 23, radial arms 22 and 22a, and actuating rods 21 and 21a, disposes the rake units 13 and 13a in their lowered ground engaging and working position.

When the operator desires to raise the rake units 13 and 13a he pulls on the cord 52, swinging the lever forwardly from its normal position of Fig. 4 to a forwardly and upwardly inclined position, as in Fig. 5. When this occurs the saddle bar 43 is shifted in a rearward direction, whereby the foremost shoe 47 is moved toward and into the slot 42, shifting the roller 40, together with the fork 38, radially inwardly. Such a shifting movement of the fork 38 imparts a corresponding rotary motion to the cam lever 37, whereupon the brake band assembly 35 is engaged with the brake drum 28, causing the disc 34, together with the parts mounted thereon, and including the spindle 31, to rotate with the wheel 5; the roller then tracking on the flange 29a of the drum 29, as shown in Fig. 5, and moving therein in a clockwise direction.

With such operation of the parts the crank 32 rotates in a direction to advance the connecting rod 33, causing raising of the rake units 13 and 13a.

If the operator has continued to maintain tension on the pull cord 52 and the lever 50 in its forwardly and upwardly inclined position, the roller 40, after a half revolution of the wheel 5 and connected parts, drops into the slot 41, as shown in Figs. 2, 3, and 6, whereupon the fork 38 shifts radially outwardly, under the influence of releasing action of the brake band assembly 35, which then occurs. The moment that the brake band assembly 35 releases, the disc 34, spindle 31, and crank 32 cease to rotate, and are held stationary by said seating of the roller 40 in slot 41. With the parts in this position the rake units 13 and 13a are locked in raised position for transporting, or until release and lowering is desired by the tractor operator.

When the operator desires to lower the rake units from their raised position he relieves the tension on pull cord 52, permitting the pull-back spring 53 to return lever 50 to its initial or starting position. When this occurs the saddle bar 43 shifts forwardly; the rearmost shoe 47 pushes the roller 40 fully into the drum 29; the resulting radially inward shifting of the fork engages the brake band assembly 35; and the roller, together with the disc 34, spindle 31, and crank 32, are driven by the wheel 5 through a further half circle in a clockwise direction until the roller snaps into the slot 42. This motion of the parts actuates the connecting rod 33 in a direction to retract the same and to lower the rake units 13 and 13a to a working position. When the roller 40 snaps into the slot 42, as in Fig. 7, the brake band assembly 35 is again released, so that the entire mechanism becomes inactive, yet ready for a further cycle of operation.

If the tractor operator desires the rake units to recurringly raise and lower, without the mechanism locking itself as the roller 40 passes either the slot 41 or 42, the pull cord 52 is advanced a distance only sufficient to move the lever 50 to a central position, as shown in Fig. 8, whereupon the shoes 47 are both disposed closely adjacent corresponding ones of the slots 41 and 42, and sufficiently close to prevent the roller 40 from seating in locking relation in either of said slots. Thus, once the roller begins to track in the drum 29, with the brake drum assembly 35 engaged, the described mechanism operates to cause recurring raising and lowering of the rake units 13 and 13a as the connecting rod 33 is reciprocated by the crank 32. This recurring raising and lowering of the rake units may be used when it is desired to turn hay in the field without substantially windrowing the hay. To stop the mechanism when operating recurringly as above, the operator merely releases the pull cord 52 so that the roller 40 falls into one of the slots in locking relation to said mechanism.

The above described wheel actuated mechanism provides a practical, effective, and positive means of power raising and lowering the rake units of the hay rake; such mechanism being relatively simple in construction and requiring a minimum of maintenance or repair.

When the frame section 2 is folded upwardly to its transport position, the corresponding actuating rod 21a is first detached from the corresponding rigid arm 20a and laid upon the frame section 1. In this manner the frame section 2 can be folded upwardly without damaging said rod 21a.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable element connected with the rake unit and operative upon reciprocation thereof to swing the unit between said positions, and operator controlled mechanism actuated from one of the wheels and being operative to reciprocate said element; said mechanism including a normally stationary but rotatable member adjacent said one wheel, a normally released brake assembly interposed between the wheel and rotatable member, means to engage the brake assembly whereby to cause said member to rotate with the wheel, and a crank secured to said rotatable member and associated with said longitudinally movable member to reciprocate the same.

2. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable element connected with the rake unit and operative upon reciprocation thereof to swing the unit between said positions, and operator controlled mechanism actuated from one of the wheels and being operative to reciprocate said element; said mechanism including a normally stationary but rotatable member adjacent said one wheel, a normally released brake assembly interposed between the wheel and rotatable member, operator controlled means to engage the brake assembly and to then maintain the engagement for substantially one full revolution of the wheel whereupon said brake assembly is released, and a crank secured to said rotatable member and associated with said longitudinally movable member to reciprocate the same.

3. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable element connected with the rake unit and operative upon reciprocation thereof to swing the unit between said positions, and operator controlled mechanism actuated from one of the wheels and being operative to reciprocate said element; said mechanism including a normally stationary but rotatable member adjacent said one wheel, a normally released brake assembly interposed between the wheel and rotatable member, operator controlled means to engage the brake assembly and to then maintain the engagement for a part revolution or substantially a full revolution, selectively, and a crank secured to said rotatable member and associated with said longitudinally movable member to reciprocate the same.

4. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable rod extending to adjacent one wheel, the rod being arranged to raise and lower the rake unit upon reciprocation of said rod, a brake drum on said one wheel, a normally stationary disc mounted adjacent and concentric to the brake drum, a normally released brake assembly mounted on the disc and disposed in the brake drum in cooperative relation, a crank on the disc, said crank being attached to the rod in reciprocating relation to the latter, and operator controlled means arranged to engage the brake assembly whereby the disc and crank rotate with the wheel.

5. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable rod extending to adjacent one wheel, the rod being operative to raise and lower the rake unit upon reciprocation of said rod, a brake drum on said one wheel, a normally stationary disc mounted adjacent and concentric to the brake drum, a normally released brake assembly mounted on the disc and disposed in the brake drum in cooperative relation, a crank on the disc, said crank being attached to the rod in reciprocating relation to the latter, and operator controlled means arranged to engage the brake assembly whereby the disc and crank rotate with the wheel; said means being operative to maintain said engagement for predetermined rotation of the wheel.

6. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable rod extending to adjacent one wheel, the rod being operative to raise and lower the rake unit upon reciprocation of said rod, a brake drum on said one wheel, a normally stationary disc mounted adjacent and concentric to the brake drum, a normally released brake assembly mounted on the disc and disposed in the brake drum in cooperative relation, a crank on the disc, said crank being attached to the rod in reciprocating relation to the latter, and operator controlled means arranged to engage the brake assembly whereby the disc and crank rotate with the wheel; said means being operative to maintain said engagement for substantially a half revolution, or substantially a full revolution of the wheel, at the selection of the operator.

7. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable rod extending to adjacent one wheel, the rod being operative to raise and lower the rake unit upon reciprocation of said rod, a brake drum on said one wheel, a normally stationary disc mounted adjacent and concentric to the brake drum, a normally released brake assembly mounted on the disc and disposed in the brake drum in cooperative relation, a crank on the disc, said crank being attached to the rod in reciprocating relation to the latter, and operator controlled means arranged to engage the brake assembly whereby the disc and crank rotate with the wheel; said means including a rigid member extending substantially radially of the disc in guided relation thereon, radially inward movement of said member engaging the brake assembly, a roller on the outer end of said member and projecting therefrom, a fixed drum surrounding the disc and member, the roller being positioned to track within the fixed drum and then urging the member in a direction to engage the brake, the fixed drum having a slot at one point therein, the roller normally resting in the slot and the member then being in brake release position, and lever actuated means to engage and press said roller inward until the brake assembly is engaged and said roller moves away from the slot.

8. In a hay rake which includes a main frame, transversely spaced wheels supporting the frame, and a rake carrying unit mounted on the frame for vertical swinging movement between a lowered and raised position of the rake; a rake dumping means, such dumping means including a longitudinally movable rod extending to adjacent one wheel, the rod being operative to raise and lower the rake unit upon reciprocation of said rod, a brake drum on said one wheel, a normally stationary disc mounted adjacent and concentric to the brake drum, a normally released brake assembly mounted on the disc and disposed in the brake drum in cooperative relation, a crank on the disc, said crank being attached to the rod in reciprocating relation to the latter, and operator controlled means arranged to engage the brake assembly whereby the disc and crank rotate with the wheel; said means including a rigid member extending substantially radially of the disc in guided relation thereon, radially inward movement of said member engaging the brake assembly, a roller on the outer end of said member and projecting therefrom, a fixed drum surrounding the disc and member, the roller being positioned to track within the fixed drum and then urging the member in a direction to engage the brake, the fixed drum having circumferentially spaced slots therein for reception of the roller, the roller when resting in either of said slots being in brake release position, and lever actuated means to engage and press said roller inward from either slot until the brake assembly is engaged and said roller moves away from the slot.

9. A hay rake as in claim 8 in which said lever actuated means includes a bar unit extending across the fixed drum, substantially alined arms extending inwardly from opposite ends of the bar unit to adjacent corresponding ones of said slots, and shoes on the inner ends of the arms to engage the roller as seated in either slot, said arms being guided for movement lengthwise thereof, and a lever arranged to move the bar unit in either direction.

10. A hay rake as in claim 8 in which said lever actuated means includes a bar unit extending across the fixed drum, substantially alined arms extending inwardly from opposite ends of the bar unit to adjacent corresponding ones of said slots, and shoes on the inner ends of the arms to engage the roller as seated in either slot, said arms being guided for movement lengthwise thereof, and a lever arranged to move the bar unit in either direction; the shoes being formed to enter the corresponding slot whereby to close the same against entry of the roller.

11. In a hay rake which includes a mobile main frame and a rake carrying frame which is hinged along the back edge of the main frame; a rake dumping means, such dumping means including an upstanding arm on the rake carrying frame, a rod pivoted to the arm and projecting forwardly therefrom, a ground engaging wheel carried by the main frame, and operator controlled means for selectively connecting the wheel into driving relation with the rod to reciprocate the latter and swing the rake frame on its hinges.

12. A structure as in claim 11 including a sub-frame pivoted to the main frame for up and down swinging movement; a compression spring interposed between the underside of the main frame and the upper side of the sub-frame, the wheel being journaled in said sub-frame.

13. A structure as in claim 11 in which said last named means includes a radial arm journaled on the main frame, the rod being pivoted to said arm, a crank having a crank shaft coaxial with the axis of the wheel, a rod connecting the crank and the radial arm, and clutch means for placing the crank shaft in and out of driving connection with the wheel.

14. A structure as in claim 13 in which the clutch means includes a normally released brake band and drum connection interposed between the wheel and crank shaft, respectively, and means to apply the brake band to the brake drum to connect the wheel in driving relation with the crank shaft.

15. A structure as in claim 14 including means to release the brake band when the crank shaft has moved through a half revolution and simultaneously lock the crank shaft against further movement.

16. A structure as in claim 15 including means to release the crank shaft from said locked position.

17. In a hay rake which includes a mobile main frame and a rake carrying frame hinged to the back edge of the main frame; a rake dumping means, such dumping means including an upstanding arm on the rake carrying frame, a rod pivoted to the arm, a shaft journaled on the main frame, a radial arm on said shaft, said rod being pivoted to said radial arm, a crank having a crank shaft journal supported by the main frame, a rod connecting the crank and the radial arm, a stationary drum supported by the main frame and including an annular flange provided with a pair of opposed openings, a disc fixed to the crank shaft, a yoke mounted on the disc for rotation therewith and radial sliding movement relative thereto, a roller on the outer end of the yoke and operable to track inside the flange and to project through either of said openings, a ground engaging wheel journal-supported by the main frame, a brake drum on the wheel, a normally spring released brake band disposed within the drum and including a stub shaft projecting through the disc, a cam lever on the outer end of the stub shaft, said cam lever being engageable by the yoke to set the brake band into engagement with the brake drum on the wheel, a saddle bar supported by the main frame for longitudinal sliding movement, a projecting leg on each end of the saddle bar, an arcuate shoe on each leg, such shoes being in alinement with said openings in the stationary drum, and lever means connected with the saddle bar and operable to impart sliding movement to such bar to cause engagement of one of the shoes with the roller when the latter projects through an adjacent one of the openings.

18. In a hay rake which includes a main frame, transversely spaced wheels supporting the frame, and a rake carrying unit mounted on the frame for vertical swinging movement between a lowered and a raised position of the rake; a rake dumping means, such dumping means including a longitudinally movable element connected with the rake unit and operable upon reciprocation thereof to swing the unit between lowered and raised positions, or vice versa, and operator controlled means actuated by one of the wheels and operable to impart a reciprocating movement to said element, said last named means including a wheel driven crank associated with said element to impart such reciprocating movement thereto.

ABEL B. BRANCO.

REFERENCES CITED

The following references are of record in the file of this patent:

UNITED STATES PATENTS

| Number | Name | Date |
| --- | --- | --- |
| 160,387 | Bushnell | Mar. 2, 1875 |
| 205,545 | Hall | July 2, 1878 |
| 240,321 | Maxwell | Apr. 19, 1881 |
| 368,787 | Shields | Aug. 23, 1887 |
| 370,263 | Kelchner et al. | Sept. 20, 1887 |
| 421,891 | Banta | Feb. 25, 1890 |
| 650,273 | Potter et al. | May 22, 1900 |